United States Patent [19]

Reinartz et al.

[11] Patent Number: 5,209,552
[45] Date of Patent: May 11, 1993

[54] ABS PUMP PRESSURE CONTROLS PRESSURE LIMITING VALVE AND LOADING VALVE

[75] Inventors: Hans-Dieter Reinartz, Frankfurt am Main; Helumut Steffes, Hattersheim, both of Fed. Rep. of Germany

[73] Assignee: Alfred Teves GmbH, Frankfurt am Main, Fed. Rep. of Germany

[21] Appl. No.: 936,876

[22] Filed: Aug. 27, 1992

Related U.S. Application Data

[63] Continuation of Ser. No. 699,546, May 14, 1991, abandoned.

[30] Foreign Application Priority Data

May 17, 1990 [DE] Fed. Rep. of Germany ....... 4015884

[51] Int. Cl.$^5$ .......................... B60T 8/44; B60T 8/48
[52] U.S. Cl. ................................ 303/116.2; 303/11; 303/116.1
[58] Field of Search ... 303/116 R, 116 PC, DIG. 1–4, 303/11, 116 SP

[56] References Cited

U.S. PATENT DOCUMENTS

| | | |
|---|---|---|
| 4,700,991 | 10/1987 | Nishimura et al. ...... 303/DIG. 2 X |
| 4,718,733 | 1/1988 | Fujita ........................ 303/2 |
| 4,936,638 | 6/1990 | Burgdorf ................. 303/116 R |
| 4,964,681 | 10/1990 | Burgdorf et al. ........ 303/DIG. 4 X |

FOREIGN PATENT DOCUMENTS

| | | |
|---|---|---|
| 0181156 | 6/1987 | European Pat. Off. . |
| 0426508 | 5/1991 | European Pat. Off. . |
| 3834539 | 4/1990 | Fed. Rep. of Germany ........ 303/11 |
| 3842699 | 6/1990 | Fed. Rep. of Germany ... 303/116 R |
| 0236859 | 5/1984 | Japan . |

Primary Examiner—Douglas C. Butler
Assistant Examiner—Josie A. Ballato
Attorney, Agent, or Firm—Robert P. Seitter; J. Gordon Lewis

[57] ABSTRACT

An anti-lock-controlled brake system with a auxiliary-force-assisted braking pressure generator accommodates a master cylinder in which at least one wheel brake is connected to a main pressure line, with an auxiliary hydraulic pressure pump connected to an auxiliary pressure line the system further includes wheel sensors and electronic circuits for detecting the rotational behavior of the wheels and for generating electric braking pressure control signals which, for the purpose of slip control, control the electromagnetically operable inlet valves and outlet valves inserted into the pressure medium lines. A pressure limiting valve is responsive to the pressure of the auxiliary pressure pump and to a pressure acting on the wheel brake to control the outlet pressure of the pump.

5 Claims, 1 Drawing Sheet

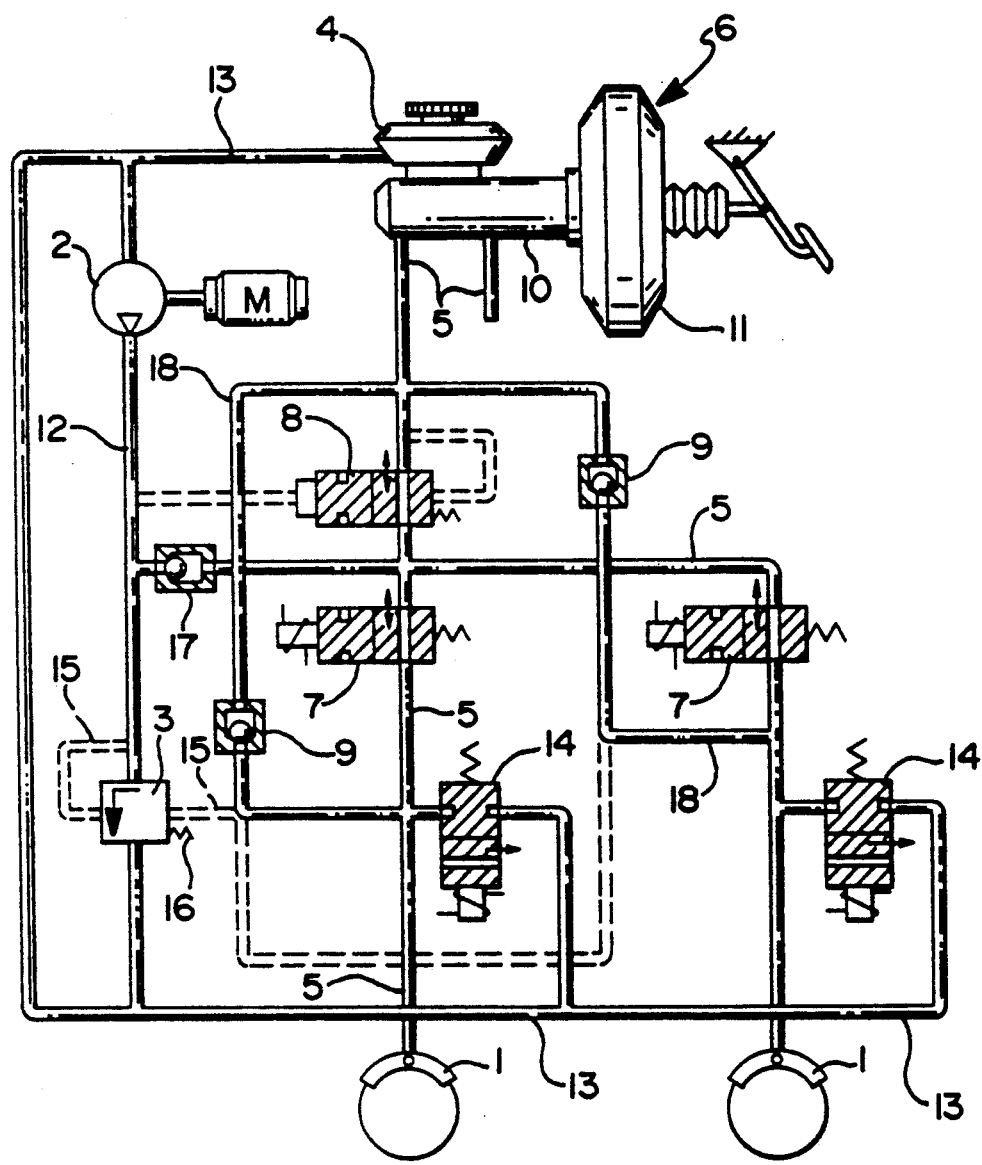

ABS PUMP PRESSURE CONTROLS PRESSURE LIMITING VALVE AND LOADING VALVE

This application is a continuation of application Ser. No. 07/699,546, filed May 14, 1991, now abandoned.

INTRODUCTION

This invention relates to an anti-lock-controlled brake system, in particular for automotive vehicles.

BACKGROUND OF THE INVENTION

In a known slip-controlled brake system of this type (DE-OS [German Published Patent Application] No. 3 627 000), a tandem master cylinder with a pneumatic brake booster connected upstream is used as a braking pressure generator. The auxiliary pressure supply system contains two hydraulic pumps allocated respectively to one associated brake circuit connecting the wheel brakes diagonally. In case of a slip-controlled brake operation, an auxiliary pressure, proportional to the foot pressure, is introduced by means of control valves from this auxiliary pressure supply system. This dynamic auxiliary pressure, on the one hand, is transferred to the static brake circuits connected to the master cylinder. On the other hand, this dynamic pressure acts on the wheel brakes. Inlet valves are inserted into the hydraulic circuit for the purpose of slip control. Normally, the inlet valves are open and it is possible to block pressure medium delivery to the respective wheel brake by means of the inlet valves upon an imminent lock-up of a wheel.

Further, outlet valves are provided at the wheel brakes. If necessary, it is possible to drain pressure medium from the wheel brake to the storage reservoir via the outlet valves. Upon the onset of slip control, the auxiliary pressure pumps are activated via an electric motor, and a controlled pressure is introduced into the wheel brakes via the inlet and outlet valves. For reasons of safety, moreover, the pistons within the tandem master cylinder are reset or arrested by means of the dynamic hydraulic circuit.

A disadvantage of the brake system described above is that, in dependence on the dynamic flow conditions and on the pressure modulated by the operating frequencies of the valves, sound vibrations are transmitted to the brake system via the fluid so that the parts associated with the brake system which constitute an oscillatory circuit, tend to build up resonance vibrations, allowing for their specific natural number of oscillations. Apart from the mechanical strain to be considered in this context and caused by pressure pulses of varying intensity, the resulting noise level is considered to be inconvenient and should be reduced. The relatively high delivery pressure of the auxiliary pressure pump constitutes a further disadvantage. The pressure developed is not adapted to the actual needs during brake slip control and can thus contribute to the increase in the noise level.

BRIEF DESCRIPTION OF THE INVENTION

It is thus an object of this invention to improve an anti-lock-controlled brake system such as to be able to reduce the afore-described undesired noise development, caused by pressure pulses of varying intensity and the instationary sound emissions caused thereby. Further, it is an object of this invention to provide an improvement in the control characteristics of a slip-controlled braking system.

According to this invention, this object is solved by limiting the pump pressure and pump volume in dependence on the wheel brake pressure in order to adapt the relatively high pump pressure individually to the actual needs of brake slip control.

To this end, it is advantageous to control the differential pressure effective between the inlet valve and the wheel brake by a pressure limiting valve which is hydraulically connected to the wheel cylinder pressure, on the one hand, and to the auxiliary pressure pump, on the other hand, in order to establish hydraulic communication with the pressureless storage reservoir if a defined prepressure is exceeded in the pressure limiting valve.

So as to prevent pressure medium from unintentionally returning into the master cylinder and, hence, into the pressureless storage reservoir during automatic braking pressure control, a further embodiment incorporates a locking valve into the main pressure line, namely between the master cylinder and the inlet valve associated with the wheel brake. This locking valve interrupts pressure medium communication between the braking pressure generator and the wheel brake upon development of the controlled pressure of the auxiliary pressure pump.

A further feature of the inventive brake system comprises a compression spring arranged to make it possible to adjust the pressure across the pressure limiting valve to, e.g., 20 bar in order to maintain the desired pressure difference across the inlet valve.

A non-return valve, opening in the direction of the master cylinder as well as arranged parallel to the main pressure line, is expediently provided between the braking pressure generator and the hydraulically actuatable locking valve so that, for operationally relevant considerations, a rapid pressure reduction is ensured in the wheel brake, if needed.

Because of the axle load distribution typical of driving dynamics and because of the resulting braking force distribution between the front and rear axle brakes, the invention controls the auxiliary pressure pump in dependence on the braking pressure in the front wheel brake.

A particular embodiment for realizing a variable pump delivery volume or pump pressure, respectively, may comprise an arrangement which varies the pump stroke of the usual piston-type pumps via an eccentric adjusting mechanism.

A further development of the inventive idea in terms of control engineering provides the adaptation of the pump pressure and the delivery volume to a characteristic-data-specific speed/torque variation while maintaining a constant pump performance.

Further characteristics, advantages and applications of the present invention result from the following description of one example of an embodiment, reference being made to a drawing. Therein, taken on their own as well as in any reasonable combination, all the characteristics described and/or represented by way of images form the subject matter of this invention, regardless of their summarization in the claims or of the interrelation of said claims.

BRIEF DESCRIPTION OF THE DRAWING

The Figure shows the basic hydraulic circuitry of the inventive anti-lock-controlled brake system with diagonal brake circuit allocation. For the sake of a clearer view, only one of the two brake circuit diagonals is shown and explained.

DETAILED DESCRIPTION OF THE PREFERRED EMBODIMENT

The brake system in accordance with the Figure consists of a braking pressure generator 6 which, via branched main pressure lines 5, establishes hydraulic communication to wheel brakes 1 featuring diagonal allocation. The braking pressure generator 6 has a tandem master cylinder 10 and a vacuum booster 11, a storage reservoir 4 being fastened directly in a conventional manner to the tandem master cylinder 10. Disposed in the main pressure line 5, there are a locking valve 8 associated with the braking pressure generator 6 and an inlet valve 7 connected to the wheel brake 1 of the front axle. The inlet valve 7 is electromagnetically actuatable. This arrangement likewise permits the substitution of the electromagnetically operated inlet valve 7 with a hydraulically operable orifice. This, however, implies a special adaptation of the control algorithm to the needs of automatic braking pressure control. In the branch between the locking valve 8 and the inlet valve 7, there follow the main pressure line 5, which is associated with the second diagonal wheel brake 1 and in which is provided an inlet valve 7, as well as an auxiliary pressure line 12 connecting an auxiliary pressure pump 2 to the main pressure line 5 with an interposed one way valve 17 blocking reverse flow. A return line 13, connecting the diagonal wheel brakes 1 with the storage reservoir 4, accommodates one electromagnetically controllable outlet valve 14 in a line connecting the wheel brakes 1 and the inlet valves 7 and further communicates with the suction line of the auxiliary pressure pump 2 as well as with a hydraulic connection of a pressure limiting valve 3. Via control pressure lines 15, branched off from the auxiliary pressure line 12 and from the main pressure line 5, the pressure limiting valve 3 communicates with the auxiliary pressure pump 2, on the one hand, and with the wheel brake 1 of the front axle, on the other hand. Further, in a logical OR circuit, a second wheel brake 1' is exemplarily linked with the pressure limiting valve 3. Due to the provision of a compression spring 16 in the pressure limiting valve 3, a prestressing force is imposed for the generation of the desired hydraulic pre-pressure. Branched off between the braking pressure generator 6 and the hydraulically controllable locking valve 8, there is a non-return valve 9 in a pressure medium connection line 18 arranged parallel to the main pressure line 5, the non-return valve 9 communicating with the respective appertaining wheel brake 1.

Mode of operation:

The valve operating position as per the Figure generally apply to the brake-released position as well as to the condition during the slip-free normal position of the brakes.

In the slip-free operating position of the brakes, the actuation of the braking pressure generator 6 will cause a pressure proportional to the foot pressure to be built up in the main pressure line 5 via the locking valve open in the basic position and via the inlet valves associated with the wheel brakes 1. The outlet valves 4 associated with the wheel brakes 1 and the non-return valves 9 remain closed in their basic positions while the pressure of the main pressure line 5 is present in the hydraulic control pressure line 15 of the pressure limiting valve 3 in a manner which balances the action of the compression spring 16. The control pressure line 15, connecting the pressure limiting valve 3 to the auxiliary pressure line 12, remains unpressurized for the time being due to a non-return valve 17, locking in the direction of the inactive auxiliary pressure pump 2.

As soon as low friction values of the road surface cause brake slip signals to be transmitted to an electronic slip control unit (not illustrated) that a vehicle wheel is overbraked, the braking pressure in the threatened wheel brake 1 is reduced within the scope of antilock control by opening of the outlet valve 14 and closing of the associated inlet valve 7. Likewise, the electronic control unit actuates the auxiliary pressure pump 2 so as to provide the auxiliary pressure. The auxiliary pressure switches the locking valve 8 into its locking position so that the braking pressure generator 6 is isolated from the pump pressure prevailing in the main pressure line 5. Due to the pressure limiting valve 3 being preset via the compression spring 16 and via the hydraulic connection of the pressure limiting valve 3 with the wheel brake 1 of the front axle via control pressure line 19, and due to the hydraulic communication towards the auxiliary pressure pump 2, the pump pressure is automatically regulated in dependence on the wheel brake pressure exerted on the pressure limiting valve 3 as predetermined by the spring-force-adjusted hydraulic pre-pressure. Consequently, the pump pressure is adjusted by the pressure limiting valve 3 to equal the respective wheel brake pressure plus the preadjusted pre-pressure. Thus, on the one hand, if needed, the pressure build-up of the auxiliary pressure pump 2 can take place more quickly since, by means of the inventive hydraulic circuitry, the auxiliary pressure only has to overcome a pressure which is relatively small. On the other hand, the noise emission of the inlet valve 7 is markedly reduced because the pressure difference across the inlet valve 7 cannot be higher than the pre-pressure of the pressure limiting valve 3 that has been generated by the compression spring 16.

As soon as, via the already known wheel sensor, brake slip signals cause the electronic control unit to effect braking pressure control up to high friction values, after the outlet valve 14 is closed to initiate the pressure build-up phase, the inlet valve 7 is opened. The dynamic pressure generated by the auxiliary pressure pump 2 and metered via the pressure limiting valve 3 can adapt itself relatively quickly to the required pressure level. By analogy with braking pressure control down to low friction values, in the brake-slip-controlled operation up to high friction values the pressure difference across the inlet valve 7 is kept constant at, for instance, 20 bar by the fixed pressure level difference across the pressure limiting valve 3 under all operating conditions so that a considerable noise reduction will occur at the inlet valve 7.

Controlling the pump pressure in dependence on the respective braking pressure prevailing in the wheel brake 1, especially in the front axle brake, ensures adaptation of the auxiliary hydraulic supply source to the varying friction values between the road surface and the vehicle wheel in conformity with actual needs. This means that the auxiliary pressure pump 2 delivers a lower auxiliary pressure in case of low friction values and that it increases the pressure correspondingly in case of high friction values so that, at least during slip control down to low friction values, it is possible to achieve a considerable improvement in the quality of control.

What is claimed is:

1. An anti-lock controlled vehicle brake system including a wheel brake, comprising:
   an operator actuated braking pressure generator interconnected with said at least one wheel brake through a main pressure line;
   an auxiliary hydraulic pressure pump operable during anti-lock control to discharge pressurized fluid into an auxiliary pressure line, said auxiliary pressure line connected to said main pressure line;
   a low pressure fluid storage reservoir and a return line connecting said wheel brake to said low pressure fluid storage reservoir;
   an electromagnetically operable normally open inlet valve connected to said main and auxiliary pressure lines controlling communication of both said pressure generator and said auxiliary hydraulic pressure pump with said wheel brake;
   an electromagnetically operable normally closed outlet valve in said return line;
   a locking valve interposed in said main pressure line operable to isolate said pressure generator form said auxiliary pressure line upon operation of said auxiliary hydraulic pressure pump; and
   a pressure limiting valve having an inlet connected to said auxiliary hydraulic pressure pump, an outlet connected to and in fluid communication with said return line, and first and second control lines connected to said auxiliary pressure line upstream of said pressure limiting valve and to said wheel brake, respectively, said first and second control lines establishing controlled hydraulic communication of said auxiliary pressure line with said return line to effect control of auxiliary hydraulic pressure pump pressure supplied to said main pressure line in correspondence with said auxiliary hydraulic pressure pump pressure and said wheel brake pressure, said pressure limiting valve including means for establishing a predetermined pressure from said auxiliary hydraulic pressure pump to said main pressure line at a level equal to a fixed difference over said pressure at said wheel brake irrespective of the pressure generated by said braking pressure generator.

2. An anti-lock controlled brake system as claimed in claim 1, wherein said means for establishing a predetermined pressure includes a compression spring arranged to generate said fixed difference in pump generated pressure in said main pressure line over said wheel brake pressure.

3. An anti-lock controlled brake system as claimed in claim 1, wherein said fixed difference is equal to 20 bar.

4. An anti-lock controlled brake system as claimed in claim 1, further comprising at least one pressure medium connection line disposed between said braking pressure generator and said locking valve, said connection line including a non-return valve closing int he direction of said wheel brake and arranged parallel to said main pressure line.

5. An anti-lock controlled brake system as claimed in claim 1, wherein said brake includes a vehicle front axle brake, wherein said brake system further includes a second brake, and wherein said second line is connected to each of said front axle brake and second brake in a logical OR circuit.

* * * * *